(12) United States Patent
Maharana et al.

(10) Patent No.: US 7,917,659 B2
(45) Date of Patent: Mar. 29, 2011

(54) VARIABLE LENGTH COMMAND PULL WITH CONTIGUOUS SEQUENTIAL LAYOUT

(75) Inventors: Parag Maharana, Fremont, CA (US); Basavaraj Hallyal, Fremont, CA (US); Senthil Murugan Thangaraj, Fremont, CA (US); Gurpreet Singh Anand, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 625 days.

(21) Appl. No.: 11/070,131

(22) Filed: Mar. 1, 2005

(65) Prior Publication Data

US 2006/0200595 A1    Sep. 7, 2006

(51) Int. Cl.
*G06F 3/00* (2006.01)
*G06F 13/28* (2006.01)

(52) U.S. Cl. .......... 710/5; 710/24; 710/30; 710/48; 712/220; 712/225

(58) Field of Classification Search ............ 710/5, 30, 710/24, 48
See application file for complete search history.

(56) References Cited

U.S. PATENT DOCUMENTS

| | | | |
|---|---|---|---|
| 5,717,725 A * | 2/1998 | Campana, Jr. | 375/347 |
| 5,740,465 A * | 4/1998 | Matsunami et al. | 710/5 |
| 5,923,896 A * | 7/1999 | Young | 710/5 |
| 6,092,116 A * | 7/2000 | Earnest et al. | 709/236 |
| 6,128,669 A * | 10/2000 | Moriarty et al. | 710/1 |
| 6,175,884 B1 * | 1/2001 | Harriman et al. | 710/30 |
| 6,542,941 B1 * | 4/2003 | Simpson, III | 710/30 |
| 6,714,592 B1 * | 3/2004 | Liu et al. | 375/240.13 |
| 6,947,602 B2 * | 9/2005 | Igarashi et al. | 382/235 |
| 2002/0013691 A1 * | 1/2002 | Warnes | 703/22 |
| 2002/0090142 A1 * | 7/2002 | Igarashi et al. | 382/246 |
| 2005/0198198 A1 * | 9/2005 | Craft et al. | 709/217 |
| 2005/0289246 A1 * | 12/2005 | Easton et al. | 710/1 |
| 2009/0080461 A1 * | 3/2009 | Barri et al. | 370/466 |

* cited by examiner

*Primary Examiner* — Henry W Tsai
*Assistant Examiner* — Michael Sun
(74) *Attorney, Agent, or Firm* — Cochran Freund & Young LLC

(57) ABSTRACT

The invention relates to a method for computer signal processing data and command transfer over an interface and more particularly to a communication between peripheral firmware and a host processor or Basic Input/Output System (BIOS) on a Peripheral Component Interconnect (PCI) bus. In one embodiment, a device and method for reducing the load on the PCI Bus is described. In yet another embodiment, a device and method is described for constructing a variable length command block comprising message frames and aligning all message frames for a particular command block that are contiguous in memory.

18 Claims, 6 Drawing Sheets

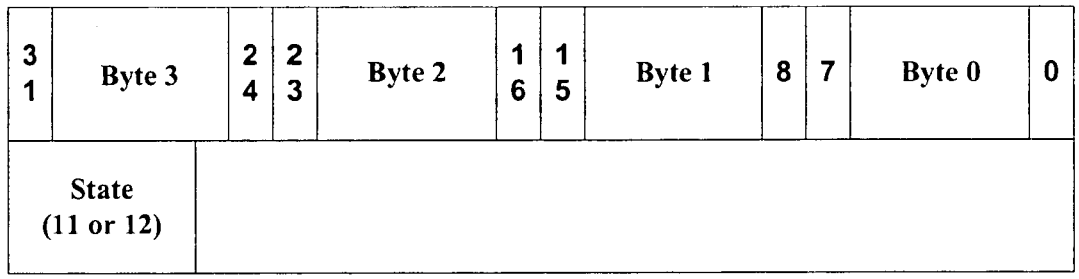

Figure 4A

| State | Name | Description |
|---|---|---|
| 0 | MFI_State_UNDEFINED | The firmware has not started initialization |
| 1 | MFI_STATE_BB_INIT | The firmware low-level initialization code is executing |
| 4 | MFI_STATE_INIT | The firmware has been loaded into memory and is initializing |
| 6 | MFI_STATE_WAIT_HAND SHAKE | The firmware is waiting for a handshake from BIOS or device driver before continuing initialization |
| 8 | MFI_STATE_DEVICE_SC AN | The firmware is scanning and initializing attached devices |
| 11 | MFI_STATE_READY | The firmware has completed initialization, but the response queue has not been initialized |
| 12 | MFI_STATE_OPERATION AL | The firmware and response queue have initialized |
| 15 | MFI_STATE_FAULT | The firmware has hit a fault condition |

Figure 4B

| 3 1 | Byte 3 | 2 4 | 2 3 | Byte 2 | 1 6 | 1 5 | Byte 1 | 8 | 7 | | 0 |
|---|---|---|---|---|---|---|---|---|---|---|---|
| State (11 or 12) | | M 6 4 | | Max SGEs Supported | | | Max Concurrent Commands Supported | | | | |

| 3 1 | | 2 4 | 2 3 | Byte 2 | 1 6 | 1 5 | Byte 1 | 8 | 7 | | 0 |
|---|---|---|---|---|---|---|---|---|---|---|---|
| | | | | | | | | | M F I | R E A D Y | A B O R T |

| State | Name | Description |
|---|---|---|
| 0 | ABORT | Abort All Pending Commands |
| 1 | READY | Transition from OPERATIONAL to READY state. |
| 2 | MFI MODE | Discard (Possible) Low MFA Posted in 64-Bit Mode |

Figure 5C

| Frame 8 Empty | Frame 7 Empty | Frame 6 Empty | Frame 5 Empty | Frame 4 Empty | Frame 3 Data | Frame 2 Data | Frame 1 Data |
|---|---|---|---|---|---|---|---|

Figure 6A

| Frame 8 Empty | Frame 7 Empty | Frame 6 Empty | Frame 5 Empty | Frame 4 Empty | Frame 3 Data | Frame 2 Data | 010 | Frame 1 Data |
|---|---|---|---|---|---|---|---|---|

| Frame 5 Data | Frame 4 Data | Frame 3 Data | Frame 2 Data | 1000 | Frame 1 Data | Frame 3 Data | Frame 2 Data | 010 | Frame 1 Data |
|---|---|---|---|---|---|---|---|---|---|

VARIABLE LENGTH COMMAND PULL WITH CONTIGUOUS SEQUENTIAL LAYOUT

BACKGROUND

A. Technical Field

The present invention relates to a method for computer signal processing, and more particularly, to a method for providing data communication between a firmware controller and a host processor or Basic Input/Output System (BIOS) on a Peripheral Component Interconnect (PCI) Bus.

B. Background of the Invention

A host processor communicates with various peripheral devices to control the operation of these devices within the processor's system. One such example is a processor communicating with a memory device, such as a redundant array of independent disks ("RAID"), via a PCI Bus. Typically, this communication between the host processor and memory device occurs in fixed frame length command blocks on the PCI Bus. For example, communication between a firmware controller and a host processor may occur in fixed eight frame length command blocks. The command blocks communicate instructions from the host processor to an agent device's controller. This controller may operate within the device firmware and operate as an input/output processor for the device.

As the number of peripherals increases and/or the size of commands from the host processor increases, the PCI Bus may become overburdened. This stress on the PCI Bus may reduce the overall performance of the host system as well as peripherals communicating on the PCI Bus. One potential cause for stressing a PCI Bus is communication between a host processor and RAID firmware.

Communication commands may operate over various different mechanisms. For example, these mechanisms may include message registers, doorbell registers, circular queues, and index registers that allow a host processor or external PCI agent and the firmware controller to communicate through message passing and interrupt generation.

One implementation of an interface between RAID firmware and a host processor is a serialized mailbox, where the driver waits for a "BusyByte" to free before it sends any command to the firmware. The mailbox is basically a fixed length array. Usually, the mailbox is adequate for single-processor systems. However, when a multi-processor system is used, the mailbox may become inadequate and stress the PCI Bus as well as introduce various timing problems between various processors within the system. The message registers generally have four 32-bit registers. Any message, which is a 32-bit data value, is passed in one of the four 32-bit registers. Each written word generates an interrupt, whose flag is cleared before writing another word, thereby passing only single words. This protocol makes the message registers unsuitable for use as head and tail pointer registers.

Circular queues support a message-passing scheme that may use four circular queues. Once again, the message passed in a circular qeue is in a fixed length format. A result of the circular queue is that the host processor can only read or write one word at a time. Additionally, the host processor cannot see the head and tail pointers so it is unable to determine how much space remains. Further, the circular queue is typically used for passing identifiers (addresses or indices) of message buffers with the message bodies being stored elsewhere.

The length of commands, and corresponding required number of frames, changes relative to which commands are communicated. If this communication is between the host processor and a RAID memory device, these frames are fixed in length which may result in empty frames on the PCI bus if a command does not require the total number of frames in the fixed length command block. These wasted empty frames may congest the PCI bus potentially reducing the performance of peripherals attached to the bus.

Accordingly it is desirable to provide a device and method that addresses the above-described problems.

SUMMARY OF THE INVENTION

The present invention discloses a device and method for providing command blocks of variable length frames for communicating between a host processor and a peripheral device processor or firmware controller. According to one embodiment of the invention, a command block is used that integrates data, in a frame within the command block, to provide the number of frames within the particular command block. This variable length command block may be transmitted on a PCI bus to communicate between a host processor and a peripheral IO processor or firmware controller. According to this embodiment, the IO processor or firmware controller identifies the length of the command block by analyzing frame length data within a first frame of the command block. This frame length data, for example, may be provided in a three bit word found in the first frame. This three bit word may be found in numerous positions within the first frame including the least significant bits.

In yet another embodiment, an IO processor or firmware controller may receive commands from multiple processors or hosts using a hardware queue. An entry in a host-defined completion queue may be placed and an interrupt signaled. A command block, having a variable frame length, is constructed with message frames and all the message frames are aligned for a particular command block contiguous in memory. Addresses to the message frames are assigned which allows the firmware to read the address of a particular frame from a register. Thereafter, the frame length data is analyzed and the number of message frames in a command block is identified. The identified number of frames is read and a command in the command block is determined.

One skilled in the art will recognize that data describing the length of a command block may be integrated within the command block and provided to a receiving device using multiple embodiments of the present invention.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 4A is an illustration of format of firmware state register according to one embodiment of the present invention.

FIG. 4B is an illustration of table listing the pre-defined firmware states and their description according to one embodiment of the invention.

FIG. 5A is an illustration of table for maximum concurrent commands and SG Entries according to one embodiment of the invention.

FIG. 5B is an illustration of format of firmware command reset register according to one embodiment of the invention.

FIG. 5C is an illustration of table listing the operations performed on firmware to reset to original state according to one embodiment of the invention.

FIG. 6A illustrates a command block having 8 frames of which only 3 frames are used to communicate a command.

FIG. 6B illustrates a command block, according to one embodiment of the invention, in which command block length data is inserted into the first frame of the command block.

FIG. 6C illustrates a data block, according to one embodiment of the invention, in which multiple commands are provided.

DETAILED DESCRIPTION OF THE PREFERRED EMBODIMENTS

An apparatus and method for providing variable length command interface between a host processor and peripheral IO processor or firmware controller is described. In one embodiment of the present invention, a variable length command block includes data that provides the number of total frames within the particular command block. Thus, the actual length of command blocks that are used to communicate between a host processor and a peripheral may vary depending on the size of the command and are not fixed to a pre-defined number of frames.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different computer readable tangible media devices including personal computers, storage devices and network servers. The embodiments of the present invention may also be present in software, hardware or firmware. Structures and devices shown below in block diagram are illustrative of exemplary embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview

The present invention describes a device and method for communicating data between a host processor and an input/output ("IO") processor or firmware controller for a peripheral. In one embodiment of the invention, a host processor communicates with a peripheral device, such as an IO processor or firmware controller, using a variable length command block that is transmitted on a PCI Bus. The number of frames within the command block may vary depending on the length of a command or data sent between the host processor and peripheral device.

Figure 1:
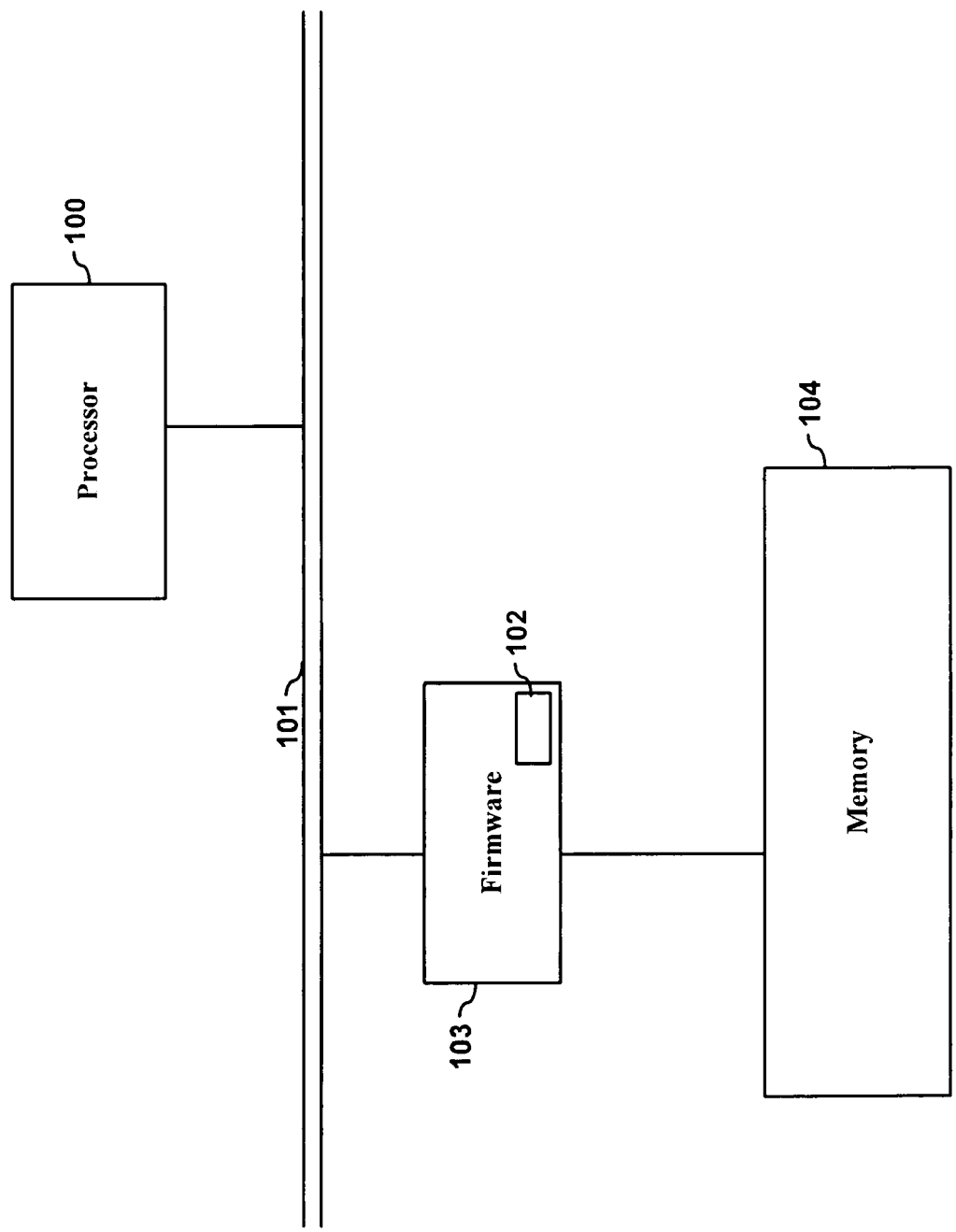
FIG. 1 is diagrammatic view of an interface between a firmware controller and a system processor over a PCI Bus according to one embodiment of the invention.

FIG. 1 is a diagrammatic view of an interface between firmware 103 associated with a peripheral memory device, such as a RAID, and a host or system processor 100. The system processor 100 is connected to the controller 102 of the memory device firmware 103 through PCI Bus 101.

According to one embodiment of the invention, communication between the processor 100 and controller 102 occurs in a variable length command block that is transmitted on the PCI Bus 101. The controller 102 is able to identify and read the command block because data describing the number of frames within the block may be included within a particular frame. For example, a three bit word may be included in the first frame that identifies a command block length between one frame and eight frames.

Figure 2:
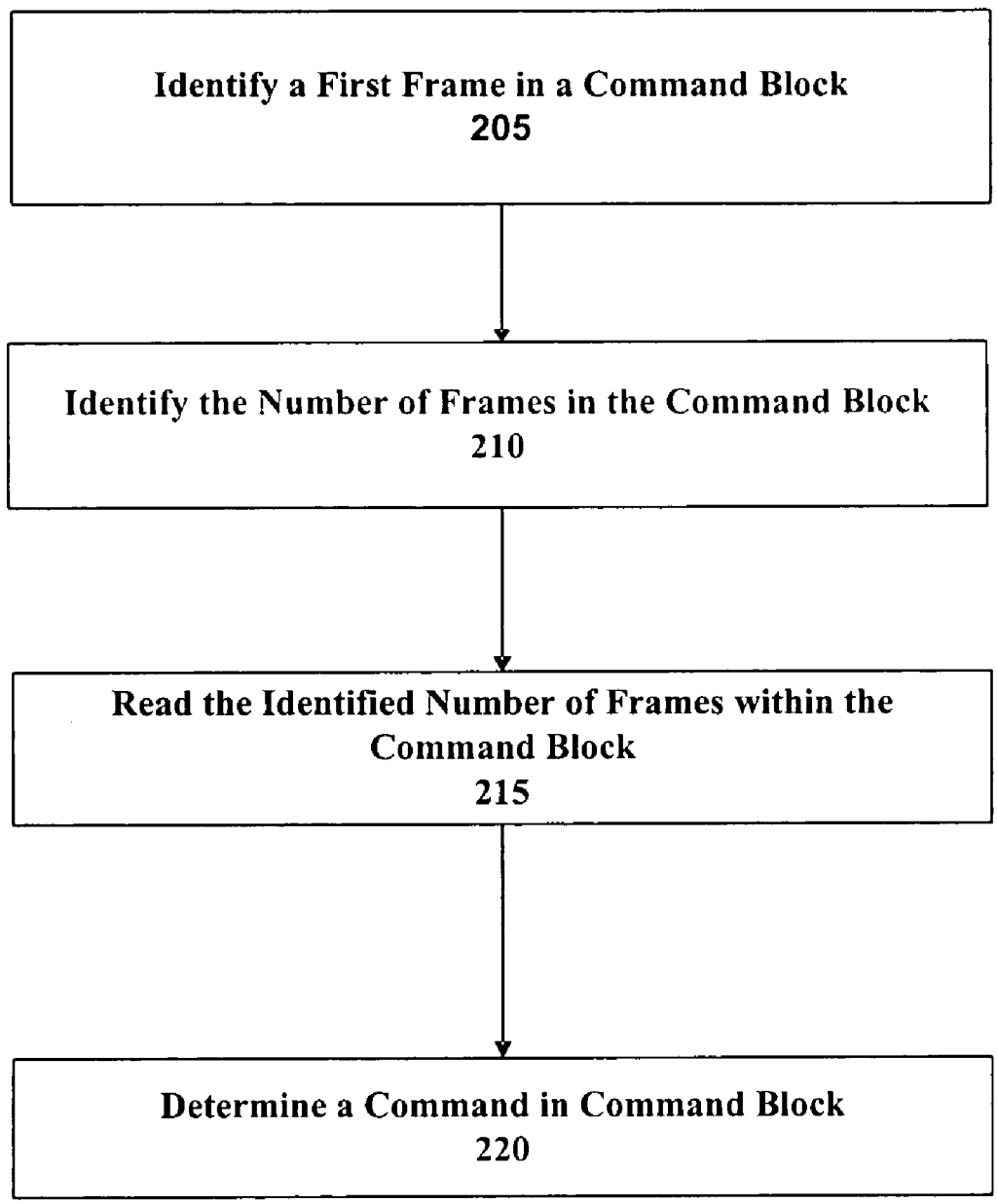
FIG. 2 is flowchart showing a method for determining a command in the command block according to one embodiment of the invention.

FIG. 2 is a general flowchart showing a method for determining a command in a command block according to one embodiment of the invention. The command block is constructed of at least one data frame but may also include multiple frames. At the receiving side of a command communication, a first frame of the command block is identified 205. This first frame may be identified using a number of different methods including through its relative position within a signal or through an identifier integrated within the first frame itself.

After the first frame is identified, a processor or controller, such as the firmware controller 102 discussed above, analyzes 210 the first frame for data describing the number of frames within the command block. For example, as mentioned above, a three bit word may be included within the first frame that discloses the number of frames within the particular command block. This three bit word may be positioned anywhere within the first frame including the least significant three bits. One skilled in the art will recognize that this information disclosing the number of frames within a particular command block may be provided the firmware controller 102 using a number of different mechanisms.

Once the number of frames in the command block is identified, the corresponding number of frames, comprising a complete command block, is read 215. Thus, if the three bit word discloses a five frame command block, the firmware controller 102 reads the first frame and next four sequential frames in order to complete the command block. Thereafter, the command in the command block is determined 220 and the controller or processor acts accordingly.

B. Variable Length Command Block for Dual Addressing Scheme

Communication between the host processor 100 and controller 102 may include the use of one or more registers. These registers may include message registers, doorbell registers, and interrupt registers. The processor 100 may put a command in an inbound post queue (e.g., circular qeue) after preparing a message frame in the host memory. If a physical address allotted to this message frame is greater than a particular value (e.g. 32 GB) then two address cycles are needed to send this frame to firmware 103. The use of two address cycles for a single command is called as Dual Addressing Scheme ("DAS").

A switch between DAS and single address scheme may be performed at runtime provided there is no pending command in firmware 103. According to one embodiment of the invention, once DAS is enabled, a driver writes a particular bit in an inbound queue port for switching back to a single address scheme. According to this embodiment, a single address scheme is set as a default when the firmware 103 boots up. If the physical address of the message frame is less than a particular value (e.g., 32 GB), then it may be right shifted a certain number of bits, such as 3 bits for making the driver/agent specify the number of frames to be read. If the physical address of the message frame is greater than a particular value (e.g., 32 GB), then the number of frames to be read is specified in a lower address.

Figure 3:
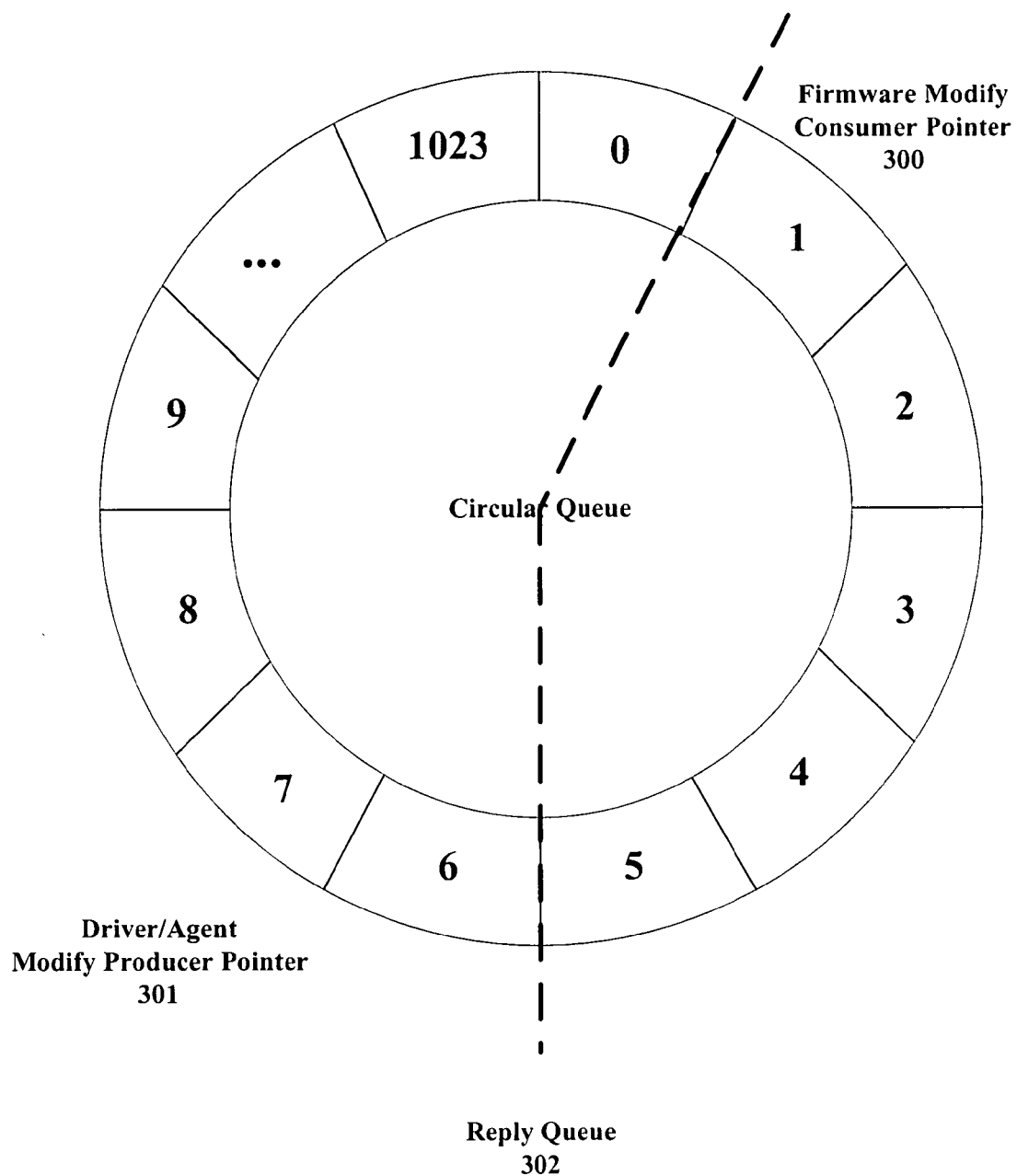
FIG. 3 is an illustration of a host based reply queue containing a driver/agent modify producer pointer and a firmware modify consumer pointer according to one embodiment of the present invention.

FIG. 3 is an illustration of a host based reply queue 302 comprising a driver/agent modify producer pointer 301 and a firmware modify consumer pointer 300. According to one embodiment of the invention, firmware 103 completes processing the command, and places the content of a message frame request in the reply queue 302. The firmware 103 also places addresses of all completed IO requests in this queue 302. The reply queue 302 may be an array of 4-bytes or 8-bytes pointers depending on a number of different factors included in a firmware initialize frame. The size of the reply queue 302 is generally kept more than the maximum number of commands that can be issued to the adapter at any one time. According to one embodiment of the invention, the size of the reply queue 302 is set by the firmware 103 and is limited to 1024. Accordingly, in this particular embodiment, a maximum of 1024 commands may be issued at any one time.

According to one embodiment of the invention, a command may be posted in the reply queue 302 by the firmware 103 along with incrementing the producer pointer 301 and issuing an interrupt. After receiving the interrupt, the driver may check an outbound interrupt status register for the status of its second bit. If the second bit is found to be set, the firmware controller 102 raises the interrupt. Firmware 103 may clear the interrupt by writing back the same value. The driver now checks the difference between the producer pointer 301 and consumer pointer 300. If there is a difference, the driver may find more commands in the reply queue 302 to be completed. The driver picks the remaining commands, completes them and sends them to the host processor 100, along with updating the consumer pointer 300. If the producer pointer 301 and consumer pointer 300 are the same, it indicates that there is no command pending for completion in the reply queue 302. The interrupt may be generated by the firmware 103 depending on the number of computed commands.

FIG. 4A is an illustration of a format for a firmware state register according to one embodiment of the invention. As described above, the status of the firmware 103 may be posted to an outbound message register and a device driver checks this register, before sending any commands. A driver may reset the modes in firmware 103 by writing to an inbound message register. According to one embodiment of the invention, the firmware state register is a 32-bit register containing the firmware state in its four Most Significant Bits (MSB) and state specific data in its remaining 28 bits.

FIG. 4B is an exemplary table listing pre-defined firmware states and their description according to one embodiment of the invention. As shown in this table, if the firmware state is in MFI_STATE_READY (11) or MFI_STATE_OPERATIONAL (12) the driver may send commands. In one particular embodiment of the invention, the firmware state is determined by reading the above-described four MSB of an outbound message register. If the state is less than MFI_STATE_READY (11), the driver waits until the firmware state becomes MFI_STATE_READY (11) before sending any commands.

If firmware state is MFI_STATE_FAULT (15), then it indicates that an internal firmware/hardware fault has occurred and the driver should not load any further commands. Further, whenever any fault occurs, the driver posts an operating system event indicating the fault condition of the controller 102. If firmware state is MFI_STATE_READY (11) or MFI_STATE_OPERATIONAL (12), then firmware 103 posts the maximum possible number of outstanding commands, and the maximum possible number of scatter/gather elements ("SGE") for any one command in the MFI_STATE register.

FIG. 5A is an illustration of table, according to one embodiment of the invention, listing the maximum concurrent commands and SG Entries as explained in relation to FIG. 4B. According to one embodiment of the invention, an "M64" field 510 indicates that a 64-bit mode is currently enabled by setting the bit within the field as 1 or disabled by setting the "M64" field as 0. Once enabled, all incoming firmware addresses (FAs) are issued as 64-bit frame pointer, and all contexts are returned as 64-bits, else, all FAs are issued as 32-bit and contexts are returned as 32-bits. During firmware initialization, a driver may clear all pending commands and set a new state using an inbound message register. The lower two bytes 512 may contain the maximum concurrent commands supported. Bits 16-23 513 indicate the maximum SGE supported and the four MSB contain the Firmware state as explained in relation to FIG. 4A.

FIG. 5B is an illustration of a format for a firmware command reset register according to one embodiment of the invention. According to this embodiment, the firmware 103 may reset to an original state whenever it receives Abort 515, Ready 520 or MegaRAID Firmware Initialize ("MFI") Mode 525 commands. In one embodiment, the firmware command reset register contains the reset states in its lower most byte. All other bytes of this register may be reserved for other applications.

FIG. 5C is an illustration of table listing the operations performed on firmware 103 to reset to original state according to one embodiment of the invention. In this embodiment, the state of the Abort operation is set as 0 and Ready Mode is set as 1, in which the firmware 103 transits from OPERATIONAL state (12) to Ready State (11) and the queue information is discarded. The MFI mode may be set as 2, the low MFA posted in 64-bit mode is discarded. All states from 3-7 may be reserved for future use.

a) Variable Length Command Block Structure

One skilled in the art will recognize that the above-described dual addressing scheme may potentially overburden a PCI Bus with commands between the host processor 100 and firmware 102. FIG. 6A illustrates a typical command block structure that may be used in such a DAS. This command block structure includes a fixed number of frames, within the command block, in which command data may be communicated. This particular structure may require unused frames to be communicated on the PCI Bus 101 resulting in wasted bandwidth on the Bus 101.

FIG. 6B illustrates a command block, according to one embodiment of the invention, having frame number data integrated in a first frame. In this particular embodiment, the first frame of the command block includes a three bit word that discloses the number of frames within the command block. In this particular example, the three bit word 610 "010" is inserted at the end of the first frame and indicates that the command block has three total frames (or two frames following the first frame). Accordingly, communication of this particular command block between the processor 100 and firmware 102 may occur in a three frame command block as opposed to the eight fixed frame command block in FIG. 6A. Thus, frames four through 8 may be discarded in this instance and not transmitted onto the PCI Bus 101.

FIG. 6C illustrates a command block, according to one embodiment of the invention, in which multiple commands are integrated into a particular number of frames, such as 8 frames as illustrated. As described above, the insertion of frame length data into a command block may allow the size of a command block to be reduced. This ability to vary the length of command blocks relative to particular commands allows for data commands to be sequenced together without any empty or filler frames. Thus, as shown in this figure, a first command block having three frames is provided within the command sequence. This first command block provides the number of frames in the command block by inserting the above-described three bit word in the first frame. In this particular instance, a "010" word 620 is inserted into the end of the first frame indicating that the command block is a three frame block.

Immediately following the first command block, a second command block having five frames is provided. The second command block provides the number of frames in the command block by inserting a "100" word 630 into the end of the first frame. This three-bit word identifies the second command block as a five frame block.

This variable length command block structure allows for a more optimized use of PCI Bus bandwidth because it reduces the number of empty or filler frames that are communicated between the host processor and a peripheral, such as the memory firmware 103. Furthermore, this variable length command block structure allows for various types of command to be communicated. These commands may include an initialize frame command, a read/write frame command, a direct command descriptor block frame command, a direct command frame command and an abort frame command.

According to one embodiment of the invention, a command requiring more than eight frames may also be supported. In this particular instance, if a three bit word identifies a command block length of eight frames (i.e., "111"), then the command block is checked to identify the actual number of frames containing the particular command.

The above description is included to illustrate the operation of the preferred embodiments and is not meant to limit the scope of the invention. From the above description, many variations will be apparent to one skilled in the art that would yet be encompassed in the spirit and scope of the invention. Accordingly, the scope of the invention is to be limited only by the following claims.

We claim:

1. A method of receiving a variable length command block at a peripheral from a PCI bus, said method comprising:
    receiving a variable length command block having at least one variable length command message, via said PCI bus, from at least one processor, said length of said variable length command block being a measurement of a total number of PCI message frames that hold said at least one variable length command message such that said length of said variable length command block changes relative to which of said at least one variable length command message is communicated;
    locating a first PCI message frame within said variable length command block;
    identifying said total number of PCI message frames, within said variable length command block, from data integrated within said first PCI message frame;
    reading said total number of PCI message frames within said variable length command block; and
    determining said at least one variable length command message within the variable length command block.

2. The method of claim 1, wherein said method is used in a dual addressing scheme.

3. The method of claim 1, wherein PCI message frames are aligned for a particular command block that is contiguously stored in memory.

4. The method of claim 1, wherein said data integrated within said first PCI message frame is a three bit word.

5. The method of claim 1, wherein said variable length command block is received by firmware associated with a memory device.

6. The method of claim 5, wherein said memory device is a redundant array of independent disks.

7. A device that receives a variable length command block from a PCI bus, said device comprising:
    a PCI bus interface that receives data from said PCI bus;
    a peripheral interface that communicates data to a peripheral; and
    a controller, coupled to said PCI bus interface and said peripheral interface, that receives a variable length command block having at least one variable length command message via said PCI bus and identifies a length of said variable length command block from data integrated in a first PCI message frame within said variable length command block, said length of said variable length command block being a measurement of a total number of PCI message frames that hold said at least one variable length command message such that said length of said variable length command block changes relative to which of said at least one variable length command message is communicated.

8. The device of claim 7, wherein said controller is integrated into firmware associated with a peripheral.

9. The device of claim 7, wherein said controller is able to identify the length of the variable length command block from data integrated in the first PCI message frame of said variable length command block.

10. The device of claim 9, wherein data integrated in said first PCI message frame is a three bit word that indicates said length of said variable length command block.

11. The device of claim 7, wherein said peripheral is a memory device.

12. The device of claim 11, wherein said memory device is a redundant array of independent disks.

13. The device of claim 7, wherein said device receives said variable length command block in a dual addressing scheme.

14. A computer program product embodied on a computer readable tangible medium for enabling receiving of a variable length command block from a PCI bus, said computer program product comprising computer instructions for:
    receiving a variable length command block having at least one variable length command message, via said PCI bus, from at least one processor, said length of said variable length command block being a measurement of a total number of PCI message frames that hold said at least one variable length command message such that said length of said variable length command block changes relative to which of said at least one variable length command message is communicated;
    locating a first PCI message frame within said variable length command block; and
    identifying said total number of PCI message frames, within the variable length command block, from data integrated within the first PCI message frame.

15. The computer program product of claim 14, further comprising computer instructions for: reading said total number of PCI message frames within said variable length command block; and determining said at least one variable length command message within said variable length command block.

16. The computer program product of claim 14, wherein said computer program product runs in firmware associated with a memory device.

17. The computer program product of claim 16, wherein said memory device is a redundant array of independent disks.

18. The computer program product of claim 14, wherein said variable length command block is received in a dual addressing scheme.

* * * * *